United States Patent [19]

Vander Giessen et al.

[11] Patent Number: 4,890,444
[45] Date of Patent: Jan. 2, 1990

[54] BONDED FLUTED FILTER MEDIA TO END CAP

[75] Inventors: Michael J. Vander Giessen, Blaine; Robert M. Hume, III, Cottage Grove; Leonard C. Jannusch, New Brighton, all of Minn.

[73] Assignee: H. B. Fuller Company, St. Paul, Minn.

[21] Appl. No.: 208,061

[22] Filed: Jun. 17, 1988

Related U.S. Application Data

[62] Division of Ser. No. 829,420, Feb. 13, 1986, Pat. No. 4,769,096.

[51] Int. Cl.$^4$ .............................................. B01D 39/00
[52] U.S. Cl. ........................................ 55/498; 55/510; 156/69; 156/328; 156/336; 210/493.2
[58] Field of Search ................... 55/498, 510; 156/69, 156/328, 336; 210/493.2; 536/102

[56] References Cited

U.S. PATENT DOCUMENTS

| | | | |
|---|---|---|---|
| 3,042,571 | 7/1962 | Jackson | 156/191 |
| 3,133,847 | 5/1964 | Millington | 156/69 |
| 3,170,826 | 2/1965 | Norton et al. | 156/69 |
| 3,633,756 | 1/1972 | Buckman | 210/443 |
| 4,055,694 | 10/1977 | Hadgraft et al. | 428/95 |
| 4,138,518 | 2/1979 | Sammak et al. | 428/95 |
| 4,259,096 | 3/1981 | Nakamura et al. | 156/325 X |
| 4,536,012 | 8/1985 | Hume | 281/21 R |
| 4,769,096 | 9/1988 | Vander Gessen et al. | 156/69 |

FOREIGN PATENT DOCUMENTS 1020602 12/1957 Fed. Rep. of Germany .
747780 4/1956 United Kingdom .

*Primary Examiner*—Robert A. Dawson
*Attorney, Agent, or Firm*—Merchant, Gould, Smith, Edell, Welter & Schmidt

[57] ABSTRACT

A fluted filter media to end cap bonding process and fluid filters formed by the bonding process. The process comprises coating at least one end cap and/or at least one fluted edge of the filter media with a bonding composition, contacting the end cap with the edge of the fluted filter media and curing the bonding composition coating to form a strong, continuous filter media to end cap bond. The bonding composition comprises, in adhesive latex, a thermoplastic resin and an amount of ungelatinized granular starch effective to complex a major portion of the latex water during curing of the bonding composition.

24 Claims, 1 Drawing Sheet

BONDED FLUTED FILTER MEDIA TO END CAP

This is a division, of application Ser. No. 06/829,420, filed Feb. 13, 1986 and now U.S. Pat. No. 4,769,096.

FIELD OF THE INVENTION

The invention related to an improved process for binding a fluted filter media to an end cap in a filter element using an aqueous latex bonding composition which can rapidly form a strong continuous, impervious bond between the filter media and the end cap. The bond can remain impervious after extended exposure to heated petroleum products under pressure.

BACKGROUND OF THE INVENTION

The bonding of fluted filter media to end caps in the manufacture of oil filters is currently conducted by placing a relatively thick film, about 0.8 to about 6.4 mm, of a plastisol onto two end caps and pressing the fluted edges of a fluted filter media into the mass of plastisol. The plastisol is then heated, cooled and set. FIG. 1 depicts such an oil filter utilizing metal end caps.

This process is time consuming (3 to 5 minutes per filter element) and typically labor intensive. Further, the process can require a substantial quantity of plastisol in an amount of about 8 to 10 Kg of plastisol per one thousand filter cartridges. In addition, molten plastisol can be a safety hazard as plastisols typically used release noxious gases into the atmosphere.

Accordingly, a substantial need exists for a simple, safe, and inexpensive means for quickly and securely bonding fluted filter media to end caps to form filter elements using a minimum amount of bonding composition.

SUMMARY OF THE INVENTION

We have found a process for bonding fluted filter media to end caps with a water based bonding composition. The bonding composition comprises a water based suspension of adhesive particles and an effective amount of an ungelatinized starch, to complex a major portion of the water in the bonding composition curing curing. The filter medium and cap are bonded through the composition of the invention by curing a film of the composition that is in contact with the cap and medium. When the temperature of the bonding composition reaches the gel temperature of the starch, starch absorbs free moisture and swells substantially instantaneously coalescing the bonding composition and forming an elastomeric film. While we do not wish to be bound by any theory of function, we believe that the bound water is uniformly and relatively slowly released from the swollen starch granules in a diffused manner. This controlled water release allows the resultant film to resist blister growth and subsequent charring. Rather, a multiplicity of much smaller bubbles form and burst preventing delamination of the bonding composition layer from the end cap and the filter media. The coating thus forms a uniform, impervious, resilient bonding layer without gaps and channels which is capable of withstanding continued exposure to heated fluids such as air, automobile oil, gasoline, etc. Further, while not wishing to be bound by any theory of function, we believe that a uniform, impervious, resilient bond without gaps or channels can be formed with a relatively thin layer of the bonding composition because the bonding composition, due to its hydrophilic nature, has a tendency to wet the filter media and form a concave meniscus against the filter media as shown in FIG. 4.

The present invention also provides fluid filters such as air, oil and fuel filters comprising filter media to end cap bonds formed by the process.

DETAILED DESCRIPTION OF THE INVENTION

The Bonding Process

Figure 1:
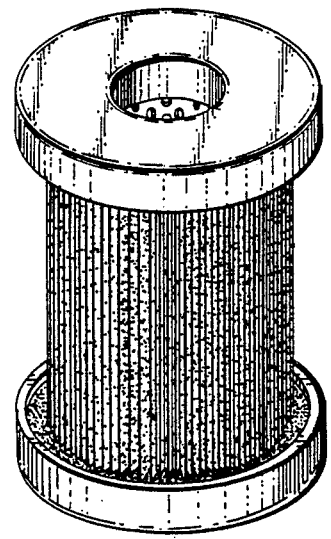
FIG. 1 is a perspective view of a prior art oil filter utilizing plastisol to bond the fluted filter media to metal end caps.
Figure 2:
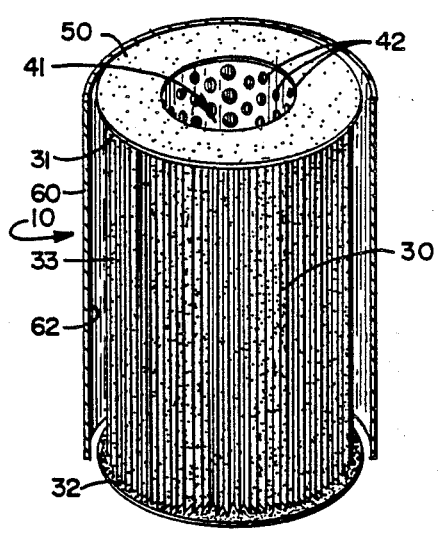
FIG. 2 is a perspective view of an oil filter of this invention utilizing cellulosic end caps.
Figure 4:
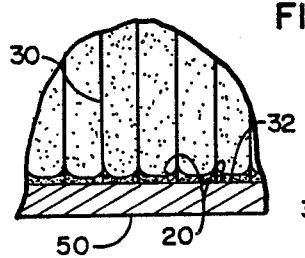
FIG. 4 is an enlarged view of the filter media to end cap bond showing wicking of the bonding composition to the filter media.
Figure 3:
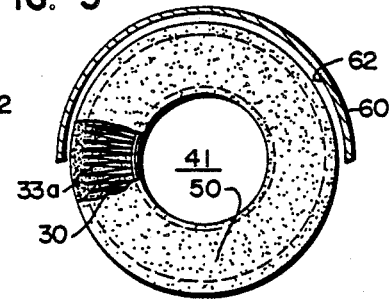
FIG. 3 is a top view of an oil filter of this invention.

The manufacturing of oil filters commonly used in automobiles involves the steps of forming a filter element 10 by placing a fluted filter media 30 around a cylindrical core support 40, bonding an end cap 50 to the cylindrical filter media 30 at fluted edges 31 and 32 and encasing the thus-formed filter element 10 in a housing 60.

In use, dirty oil is pumped under pressure into central core chamber 41 of filter element 10 through an aperture (not shown) in the center of the housing 60. The dirty oil is forced through a plurality of apertures 42 in core support 40 and then passes, under pressure, through the lateral area 33 of fluted filter media 30. Particles in the oil larger than the pores of filter media 30 are unable to pass through filter media 30 and are retained within core 41 of filter element 10. The filtered oil which flows through filter media 30 then flows between filter media 30 and inner wall 62 of housing 60, through a plurality of apertures (not shown) in the base (not shown) of housing 60, and back into the oil system. In order to insure that no unfiltered oil bypasses the filter element 10, the bonding of corrugated filter media 30 to end caps 50 must be sufficient to prevent unfiltered oil from passing between the filter media 30 and the end caps 50.

Bonding Compositions

The bonding composition of the present invention comprises a modified aqueous adhesive suspension.

Adhesive latex

In the adhesive latices of the invention a major portion of the aqueous adhesive solids are dispersed particles of adhesive polymeric resins or elastomers. Any suitable water-dispersible generally thermoplastic polymeric resin or elastomer may be employed as the polymeric solid phase, including, but not limited to polychloroprene (neoprene), styrene-butadiene rubber, vinyl-vinylidene chloride, ethylene-vinyl chloride copolymers, ethylene-vinyl acetate co-polymers, vinyl acetate-acrylic acid copolymers and acrylonitritebutadiene copolymers. Preferred polymeric latex adhesive bases include DOW 620, a carboxylated styrenebutadiene copolymer latex suspension from Dow Chemical Co., and AIRFLEX 400, a 15% ethylene-85% vinyl acetate copolymer available as a 55% aqueous dispersion from Air Products Corp. The most preferred adhesive base is NEOPRENE LATEX 115, a copolymer of chloroprene and methacrylic acid available as a 47% by weight solids aqueous dispersion with polyvinyl alcohol as the dispersing agent, from DuPont de Nemours & Co. Inc.

Aqueous adhesives are commonly prepared by dosing the suspension with minor but effective amounts of other common adhesive components such as surfactants, foam-control agents, plasticizers, viscosity modifiers, tackifying resins, antioxidants, acid scavengers and mixtures thereof. Water may also be added, if necessary, to bring the solids content into the desired range.

Starch

The highly-desirable properties exhibited by the present bonding compositions are achieved by the incorporation therein of an amount of ungelatinized, ungelled (nonswollen) starch granules effective to complex or absorb a major portion, preferably substantially all, of the water in the bonding composition during curing. It is believed that this complexation causes the adhesive particles dispersed in the bonding coating to rapidly coalesce, when the composition is heated, forming a uniform, resilient film which does not skin over. The starch granules absorb free moisture and swell at their gel temperature, effectively creating a moisture reservoir and allowing the adhesive to almost immediately coalesce once the gel temperature is reached. The starch also prevents water vapor from blistering and charring the bonding composition coating during intense heating by releasing the water diffusely from the coating. The water thereby diffuses through the bonding composition coating at a controlled rate that prevents blister formation.

Starch is a high molecular weight carbohydrate of the general formula $(C_6H_{10}O_5)_n$. Starch granules exhibit a structure of concentric sheets which contain an elutable amylose fraction in the inner layers and an amylopectin fraction in the outer layers. When starch granules are contacted with water and heated above a temperature designated the gel point, the granules begin to absorb water and swell. The gel temperature for a particular starch variety depends on a number of factors, including particle size, pH and absolute concentration. If the weight ratio of starch to water is high enough, the effect of exceeding the gel temperature will be to gel substantially all of the water into a thick paste.

Starches useful in the present bonding compositions may be selected from any of those which can be effectively mixed with the bonding composition at a concentration effective to complex a major portion of the free water present during the curing process.

Starches which may be used in the present invention may be selected from any of a wide variety of commercially-available products including but not limited to corn, wheat, barley, rice, potatoes, waxy maize, sago, sorghum, arrowroot, tapioca or mixtures thereof, with corn, wheat and barley starches being most common. These raw starches typically have granules sized within the range of about 2–150 microns, as measured along the longest axis, and exhibit gel temperatures of about 55°–80° C. Since these starches can bind about 600–1000% of their weight in water, for most binding applications useful amounts of the starch additive will fall within the range of about 1–25%, preferably about 5–20% and most preferably about 10–10% of the total wet weight of the bonding composition. Although it is preferred to add an amount of starch within these ranges which will complex a major portion of the water in the composition, amounts of starch effective to absorb 50% or less of the composition water have been found to enhance the curing characteristics of the present bonding compositions, although to a lesser extent.

Surfactants

Although the commercially-available aqueous adhesive suspensions useful as starting materials for bonding compositions of this invention often comprise minor amounts of dispersing agents for the resinous or elastomeric adhesive particles therein, it is often desirable to add additional amounts of surfactant to enhance the ability of the adhesive dispersion to wet the end caps and filter media and maintain the starch additive in suspension. The added surfactants can be nonionic, anionic, cationic, or amphoteric and should be selected so as to be compatible with the surfactants already present in the aqueous adhesive, if any.

Examples of useful nonionic surfactants include but are not limited to polyethylenoxy esters and ethers of alkylphenols, alkanols and mercaptans, as well as polyethylenoxy compounds with amide links. One useful class of nonionic surfactants is the TERGITOL series, available from Union Carbide, which are formed by condensing about 3–10 moles of ethylene oxide with a $C_{12}$–$C_{15}$ alkanol.

Examples of useful anionic surfactants include but are not limited to (a) carboxylic acids such as soaps of straight-chain naturally-occurring fatty acids, chain-substituted derivatives of fatty acids, branched-chain and odd-carbon fatty acids, acids derived from paraffin oxidation, and carboxylic acids with intermediate linkages; and (b) sulfuric esters such as sodium lauryl sulfate, tallow alcohol sulfates and coconut alcohol sulfates.

Examples of useful cationic surfactants include but are not limited to nonquaternary nitrogen bases such as amines without intermediate linkages, and quaternary nitrogen bases. Preferred quaternary ammonium surfactants are the $C_8$–$C_{20}$-alkyl-(dimethyl)-(benzyl or substituted-benzyl) ammonium halides such as benzalkonium chloride, cetalkonium chloride, methylbenzethonium chloride, cetyl(dimethyl)ethyl ammonium bromide, domiphen bromide, gentian violet, dicoco(dimethyl)ammonium chloride, cetyl(trimethyl)ammonium bromine and the like.

Foam Control Agents

In addition to the aqueous adhesive suspension, starch, and surfactant, the bonding composition preferably contains one or more foam control agents in an amount effective to substantially prevent the bonding composition from foaming when it is applied by foam inducing equipment such as a roller coater. Any agent useful to control foaming of aqueous adhesive suspensions may be employed in the present bonding composition, including but not limited to polysiloxanes such as simethicone, dimethicone copolyol, cyclomethicones and the like. Other useful foam-control agents are the proprietary NOPCO defoamers available from Nopco Chemical Division, Newark, NJ and COLLOID 675, available from Colloids, Inc., Newark, N.J.

Plasticizer

The bonding composition preferably contains a fugitive plasticizer to aid in keeping the adhesive film flexible after curing (i.e. while the filter elements are being assembled into the outer housing). Any compatible plasticizer can be used including but not limited to ethylene oxide glycol ethers and propylene oxide glycol ethers. Preferred plasticizers include propylene glycol phenyl ether and aromatic based glycol ethers, while the most preferred plasticizer is diethylene glycol butyl ether sold by Dow Chemical Co. under the trademark DOWANOL DB. An ethylene glycol ether is preferred because it adds other useful functions to the bond composition as well, such as (i) it acts as a coalescing agent aiding in stabilizing the latex; and (ii) it serves as a boiling point modifier; raising the boiling point of the bonding composition and thereby reducing skinning over of the bonding composition film which can be caused by the sudden input of intense heat.

Thickeners

In addition to the aqueous adhesive suspension, starch, surfactant, foam control agent, and plasticizer, the bonding composition preferably contains one or more thickening agents in an amount effective to control the rheology or flowability of the bonding composition so that it remains in place, as applied during the time period between application and curing. Any of the well known and commonly used thickeners may be employed in the present bonding composition so long as it is compatible with the other bonding composition components, which include but are not limited to heteropolysaccharides such as xanthan gum, substituted carboxymethyl celluloses such as carboxymethyl cellulose, carboxyethyl cellulose and hydroxyethyl cellulose, acrylic gels, and amorphous silica. A preferred useful thickener is JAGUAR, which is a mixture of guar gum and guar gum derivatives, and is available from Stein-Hall Chemicals Inc.

Tackifiers

To aid in maintaining good initial adhesion between the end cap 50 and the fluted filter media 30, the bonding composition preferably contains one or more tackifying resins to increase the green bond strength of the bonding composition. Tackifying resins which may be employed in the present bonding composition include but are not limited to hydrogenated rosin esters, esters of polyhydric alcohols, phenol-aldehyde resins and the like. Preferred tackifiers are the water-emulsified or dispersed form of the class of materials known as "hydrocarbon resins". In industrial practice "hydrocarbon resin" is a term of art relating to resins in the molecular weight range of a few hundred up to about 6,000 or 8,000 which are obtained or synthesized from rather basic hydrocarbonaceous materials such as petroleum, coal tar, turpentine, and the like. A good description of "hydrocarbon resins" can be found in Kirk-Othmer, *Encyclopedia of Chemical Technology*, Second Edition, Volume 11, Interscience, New York, 1966, p. 242. Some resins which technically contain elements other than carbon and hydrogen (e.g. the coumarone-indenes) are conventionaly included within this class called "hydrocarbon resins". A most preferred tackifier is PICCOTEX-LC-55WK, a proprietary aqueous, 55% solids dispersion of a low molecular weight, thermoplastic copolymer resin, available from Hercules, Inc.

Antioxidants

Because of the tendency of adhesive polymeric elastomers to oxidize when subjected to heat treatment, the bonding composition preferably contains one or more antioxidizing agents in an effective amount to prevent the oxidation of the adhesive polymeric elastomer when subjected to heat in the present process. Any compatible antioxidizing agent useful in preventing the oxidation of the adhesive polymeric elastomer may be employed in the present bonding composition, including but not limited to styrenate phenols, polymeric hindered phenols and bis-hindered phenols. The preferred antioxidant is antioxidant 2246, a 2,2' -methylene-bis(4-methyl-6-tertiary butyl phenol), available as a 40% dispersion sold under the trademark D-404 by Heveatex Corporation, Fall River, Mass.

The present bonding compositions may also include a minor amount of an alkali metal hydroxide salt, e.g. sodium or potassium hydroxide, effective to lower the gel temperature of the starch employed. The use of such alkali metal hydroxide salt to lower gel temperature is well known in the art and is typically used when a starch which swells at relatively high temperatures, e.g. rice starch, is employed in bonding compositions which are exposed to extreme temperature fluxes. About 0–5% of he salt can usefully be employed in the present bonding compositions.

When using an adhesive which contains chloroprene, such as the neoprenes, an acid acceptor, such as a metal oxide, should be added to the composition to combine with chlorine ions released by the chloroprene during curing and prevent the formation of acids in the composition. The most popular industrial acid acceptor is zinc oxide.

Thus, the bonding compositions of the invention can comprise a major proportion of an adhesive latex, a minor but effective amount of starch to complex the latex and optionally, effective amounts of a plasticizer, a tackifier and an alkali metal base. Specifically, the composition can contain (i) about 30–99%, preferably about 60–90 wt % of an aqueous adhesive suspension latex; (ii) about 1–25 wt %, preferably about 10–20 wt % starch; (iii) about 0.05–2%, preferably about 0.07–1% foam control agent; (iv) about 0.02–1 wt %, preferably about 0.05–0.3 wt % thickener; (v) about 10–50 wt %, preferably about 10–30 wt % tackifier dispersion; and (vi) about 0.5–5 wt %, preferably about 1–3 wt % antioxidant dispersion. Optionally, the bonding composition can comprise (a) about 0.02–5%, preferably about 0.05–2.5% of added surfactant, (b) about 0.02–5 wt %, preferably about 0.05–2 wt % plasticizer, (c) about 0.1–1% of an alkali metal hydroxide salt, and (d) when a neoprene is utilized as the adhesive, about 0.5–5%, preferably about 1–3 wt % of a metal oxide dispersion. The bonding composition will comprise about 25–75 wt % total solids, preferably about 45–65 wt % total solids and most preferably about 50–63 wt % total solids.

In the most preferred embodiment the bonding compositions of the present invention will comprise about 62–68 wt % NEOPRENE LATEX 115 having about 45 to 49 wt % solids, about 9–11 wt % starch, about 0.1–0.3wt % foam control agent, about 0.05–0.2 wt % thickener, about 16–20 wt % tackifier dispersion, about 1.5–2 wt % antioxidant dispersion, about 0.3–0.7 wt % surfactant, about 0.3–0.5 wt % plasticizer, about 0.3–0.6 wt % alkali metal hydroxide, and about 1.5–2 wt % zinc oxide dispersion.

Preparation

The present bonding compositions can be prepared by dispersing the starch and other ingredients in the aqueous adhesive latex component in any convenient manner. Typically an appropriate liquid mixer is charged with the adhesive suspension, followed by addition of the other ingredients except the starch. Slow stirring is continued until the mixture is homogeneous and then the powdered starch is gradually added. After about 0.25-0.75 hours of slow mixing, water is added, if necessary, to adjust the viscosity and bring the total percent solids into the desired range. After screening the slurry to remove any agglomerated material, the composition is ready for use.

Application

The prepared bonding composition may be applied to a face of an end cap 50 and/or to one or both the fluted edges 31 and bottom 32 of the filter media 30 by any means which results in a complete and substantially even coating, including but not limited to a roller coater, an extrusion spreader bar, a sprayer, or dipping in a coating pan. The bonding composition is applied to the end caps 50 and/or the fluted edges 31 and 32 of the filter media 30 at a coating weight of about 0.020 to 0.045 wet grams $cm^2$ before curing, preferably at a coating weight of about 0.023 to 0.040 wet grams/$cm^2$ before curing, and most preferably at a coating weight of about 0.025 to 0.031 wet grams/$cm^2$. Optionally the composition can be applied to both end cap and fluted edge. Two end caps 50 are then indexed, (i.e. correctly positioned such that the end cap entirely contacts the fluted media and the media is substantially centered on the caps) and substantially simultaneously contacted, under pressure, to the fluted edges 31 and 32 of the cylindrical filter media 30. While maintaining pressure the coating 20 is cured and dried by exposure to a heat source, for example, by radiant heaters, burners, heated platens, infrared lamps, or combinations thereof. Drying temperature should be balanced to dry the coating 20 as quickly as possible without charring or burning the end caps 50 or the filter media 30.

The coating 20 can be dried by either (i) heating oppositely positioned platens which index and forceably retain the end caps 50 against the top 31 and bottom 32 of filter media 30 during the curing and drying steps, (ii) passing the contacted filter media and end caps, still under contacting pressure by the platen, through an oven, or (iii) if speed is not a consideration, under ambient conditions. The time period of contact necessary between the heated platen and the end caps 50 will be adjusted so that the bonding composition coating has sufficient bond strength to prevent slippage between the filter media 30 and the end caps 50 when the platens release the filter element 10. The bonding composition may be heated between about 100° to 250° C. without blistering, breaking, or charring the bonding composition coat. Preferably, the bonding composition is heated to about 175° to 230° C. to increase the drying rate which results from the use of such elevated temperatures. This permits the absolute speed of the binding process to be increased dramatically over the prior art as the binding process of the invention takes about 10 to 40 seconds whereas the binding process of the prior art takes about 3 to 5 minutes.

During the drying step, the bonding composition coating 20 decreased in thickness as its water content is reduced, to yield a strong, flexible plastic film which completely and imperviously bonds the end caps 50 to the top 31 and bottom 32 of the filter media 30. The surface of the dry bonding composition coating 20 is uniformly roughened due to the diffuse escape of water vapor, which inhibits blistering. The filter element 10 is now ready to be placed within a housing 60 in accordance with the conventional process for housing the filter element 10 for its intended purpose.

EXAMPLE I

The bonding composition was prepared by adding about 651 grams of "NEOPRENE LATEX 115", a 47% solids latex dispersion of a copolymer of chloroprene and methacrylic acid dispersed with polyvinyl alcohol, to a 1.5 liter horizontal blade mixer and moderately agitating the "NEOPRENE LATEX 115". About 23 grams of a 20% KOH solution was added to the "NEOPRENE LATEX 115" in order to "uncoil" the carboxyl groups on the "NEOPRENE LATEX 115" and render it more reactive. After the KOH solution was thoroughly dispersed, about 2 grams of "COLLOIDS 675", a proprietary mixture of surfactants in a hydrocarbon base, was added as a defoamer. About 100 grams powdered uncooked barley starch was then sifted into the bonding composition and allowed to mix for about 15 minutes. About 4 grams of "DOWANOL DB", a diethylene glycol n-butyl ether manufactured by the Dow Chemical Company, and about 1 gram of "JAGUAR CMHP", a guar derivative manufactured by Stein-Hall, were mixed together and added to the bonding composition, mixing for about 30 minutes to allow the "JAGUAR CMHP" to swell and thicken the bonding composition. About 18 grams of a 60% zinc oxide dispersion, about 178 grams of a hydrocarbon resin dispersion (PICCOTEX LC-55WK), about 18 grams of "HEVEANOX D-404", a 40% antioxidant "2246" dispersion, and about 5 grams of "SURFYNOL TG", a proprietary mixture containing 2-4,7,9-tetramethyl-5-decyne-4,7-diol (TMDD), were then added to the bonding composition, in that order The bonding composition was then thoroughly mixed and ready for use.

EXAMPLE II

A filter element was made by applying the bonding composition of Example I to one side of two cellulosic oil filter end caps. The bonding composition was applied by use of a foam paint brush at a rate of about 0.025 grams of wet bonding composition per square centimeter. The coated side of the end caps were then contacted with the fluted edges of a fluted filter media and mechanically held in place by two diametrically opposed platens, heated to 205° C. for about 20 seconds.

EXAMPLE III

A filter element was made in accordance with Example II except that the end caps were made of aluminum instead of a cellulosic product.

EXAMPLE IV

A filter element is made in accordance with Example II except that the bonding composition is applied by extruding the bonding composition onto the end caps and spreading the bonding composition with a doctor blade to the desired thickness of about 0.028 grams of wet bonding composition per square centimeter.

EXAMPLE V

A filter element was made in accordance with Example II except that the bonding composition was applied at a rate of about 0.031 grams of wet bonding composition per square centimeter.

EXAMPLE VI

A filter element was made in accordance with Example II except that the end caps were mechanically held in place by two diametrically opposed unheated platens and kept in an oven heated to about 150° C. for about 2 minutes.

EXAMPLE VII

A filter element was made in accordance with Example II except that the bonding composition was applied to the fluted edges of the filter media by dipping the filter media into a shallow pan containing about 0.45–0.56 mm of the bonding composition instead of applying the bonding composition to the end caps.

EXAMPLE VIII

A filter element was made in accordance with Example II. The filter element was then allowed to cure at ambient conditions for 24 hours. Attempted hand delamination of the end cap from the filter media after the 24 hour curing period resulted in 100% fiber failure of the end cap and/or filter media.

EXAMPLE IX

A filter element was made in accordance with Example III. The filter element was then allowed to cure under ambient conditions for 24 hours. Attempted hand delamination of the end cap from the filter media after the 24 hour curing period resulted in 100% fiber failure of the filter media.

EXAMPLE X

A filter element was made in accordance with Example II. The filter element was then allowed to cure under ambient conditions for 72 hours. The filter element was then placed in about 150° C. motor oil for 72 hours. Attempted delamination of the end caps from the filter media after soaking in the motor oil and while the filter element was still hot resulted in 100% fiber failure of the end caps and/or filter media.

EXAMPLE XI

A filter element was made in accordance with Example II and tested in accordance with Example X except that the filter element was allowed to cool to room temperature before attempting to hand delaminate the end caps from the filter media. Once again, the attempted delamination resulted in 100% fiber failure of the end caps and/or filter media.

EXAMPLE XII

A filter element was made in accordance with Example II. The filter element was then allowed to cure under ambient conditions for 72 hours. The filter element was then placed in room temperature diesel fuel for 168 hours (7 days). Attempted hand delamination of the end caps from the filter media after soaking in the diesel fuel resulted in 100% fiber failure of the end caps and/or filter media.

I claim:

1. A fluid filter manufactured by bonding a fluted filter media to an end cap, which comprises the steps of:
   (a) forming, between one end cap having a bonding surface and an edge of a fluted filter medium, an effective bonding amount of a coating of a bonding composition, the bonding composition comprising, in adhesive latex, an effective bonding amount of a thermoplastic resin and an amount of ungelatinized granular starch effective to complex a major portion of the latex water;
   (b) heating the bonding composition coating to or above the gel point of the bonding composition to coalesce the bonding composition and form a continuous filter media to end cap bond; and
   (c) drying the bonding composition coating.

2. A fluid filter manufactured by bonding a fluted filter media to two end caps, each end cap having a bonding surface, which comprises the steps of:
   (a) forming on the two end caps a coating of an effective bonding amount of a bonding composition, the bonding composition comprising, in adhesive latex, an effective bonding amount of a thermoplastic resin and an amount of ungelatinized granular starch effective to complex a major portion of the latex water;
   (b) contacting the two coated end caps to opposite fluted edges of the fluted filter media;
   (c) heating the bonding composition coating to above the gel point of the bonding composition to set the bonding composition and form continuous filter media to end cap bonds; and
   (c) drying the bonding composition coating.

3. A fluid filter manufactured by bonding a fluted filter media to two end caps, each end cap having a bonding surface, which comprises the steps of:
   (a) forming, on the two end caps, a coating of an effective bonding amount of a bonding composition, the bonding composition consisting essentially of adhesive latex:
      (i) 60 to 90 wt % neoprene latex comprising about 45 to 49 wt % solids;
      (ii) 10 to 20 wt % starch selected from the group consisting of corn starch, barley starch, wheat starch, and mixtures thereof;
      (iii) 0.05 to 2.5 wt % surfactant;
      (iv) 0.05 to 2.05 wt % diethylene glycol butylether;
      (v) 0.05 to 0.30 wt % thickener selected from the group consisting of guar gum, guar gum derivatives, xanthan gum and mixtures thereof;
      (vi) 10 to 30 wt % tackifier dispersion;
      (vii) 1 to 3 wt % antioxidant dispersion;
      (viii) 0.07 to 1 wt % defoamer; and
      (ix) 1 to 3 wt % zinc oxide dispersion;
   (b) indexing the two end caps;
   (c) contacting, under pressure, the two coated end caps to opposite fluted edges of the fluted filter media;
   (d) heating the bonding composition coating to a temperature between about 175° and 220° C. for about 10 to 30 seconds to set the bonding composition and form continuous filter media to end cap bonds; and
   (e) allowing the bonding composition coating to cool to ambient temperature.

4. A fluid filter manufactured by bonding a fluted edge of a fluted filter media to an end cap having a bonding surface, which comprises the steps of:
   (a) forming, on at least one edge of the filter media, a coating of an effective bonding amount of a bonding composition to form a coated fluted edge, the bonding composition comprising, in adhesive latex, an effective bonding amount of a thermoplastic resin and an amount of ungelatinized granular starch effective to complex a major portion of the latex water;

(b) contacting the coated fluted edge of the fluted filter media with the end cap;

(c) heating the bonding composition coating to or above the gel point of the bonding composition to set the bonding composition and form a continuous filter media to end cap bond; and (d) drying the bonding composition coating.

5. A fluid filter manufactured by bonding a fluted filter media having two opposite fluted edges to two end caps, each end cap a bonding surface, which comprises the steps of:

(a) forming, on the two ends of the fluted filter media, a coating of an effective bonding amount of a bonding composition forming coated fluted edges, the bonding composition comprising, in adhesive latex, an effective bonding amount of a thermoplastic resin and an ungelatinized granular starch effective to complex a major portion of the latex water;

(b) contacting each coated fluted edge of the filter media to an end cap;

(c) heating the bonding composition coating to or above the gel point of the bonding composition to set the bonding composition and form a continuous filter media to end cap bond; and (d) drying the bonding composition coating.

6. A fluid filter manufactured by bonding an end cap having a bonding surface to each opposite fluted edge of a fluted filter media, which comprises the steps of:

(a) forming, on the opposite fluted edges of the fluted filter media, a coating of an effective bonding amount of a bonding composition, the bonding composition comprising, in adhesive latex:

(i) 60 to 90 wt % neoprene latex having about 45 to 49 wt % solids;

(ii) 10 to 20 wt % starch selected from the group consisting of corn starch, barley starch, wheat starch, and mixtures thereof;

(iii) 0.05 to 2.5 wt % surfactant;

(iv) 0.05 to 2.0 wt % diethylene glycol butylether;

(v) 0.05 to 0.30 wt % thickener selected from the group consisting of guar gum, guar gum derivatives, xanthan gum and mixtures thereof;

(vi) 10 to 30 wt % tackifier dispersion;

(vii) 0.07 to 1 wt % defoamer;

(viii) 1 to 3 wt % antioxidant dispersion; and (ix) 1 to 3 wt % zinc oxide dispersion;

(b) contacting, under pressure, each edge of the filter media to each end cap;

(c) heating the bonding composition coating to a temperature between about 175° and 220° C. for about 10 to 30 seconds to set the bonding composition and form a continuous filter media to end cap bond; and (d) allowing the bonding composition to cool to ambient temperature.

7. The fluid filter of claim 1 wherein the fluid filter is an oil filter.

8. The fluid filter claim 1 wherein the fluid filter is a fuel filter.

9. The fluid filter of claim 1 wherein the fluid filter is an air filter.

10. The fluid filter of claim 2 wherein the fluid filter is an oil filter.

11. The fluid filter of claim 2 wherein the fluid filter is a fuel filter.

12. The fluid filter of claim 2 wherein the fluid filter is an air filter.

13. The fluid filter of claim 3 wherein the fluid filter is an oil filter.

14. The fluid filter of claim 3 wherein the fluid filter is a fuel filter.

15. The fluid filter of claim 3 wherein the fluid filter is an air filter.

16. The fluid filter of claim 4 wherein the fluild filter is an oil filter.

17. The fluid filter of claim 4 wherein the fluid filter is a fuel filter.

18. The fluid filter of claim 4 wherein the fluid filter is an air filter.

19. The fluid filter of claim 5 wherein the fluid filter is an oil filter.

20. The fluid filter of claim 5 wherein the fluid filter is a fuel filter.

21. The fluid filter of claim 5 wherein the fluid filter is an air filter.

22. The fluid filter of claim 6 wherein the fluid filter is an oil filter.

23. The fluid filter of claim 6 wherein the fluid filter is a fuel filter.

24. The fluid filter of claim 6 wherein the fluid filter is an air filter.

* * * * *

UNITED STATES PATENT AND TRADEMARK OFFICE
CERTIFICATE OF CORRECTION

PATENT NO. : 4,890,444

DATED : January 2, 1990

INVENTOR(S) : MICHAEL J. VANDER GIESSEN et al.

It is certified that error appears in the above-identified patent and that said Letters Patent is hereby corrected as shown below:

Column 1, line 8, for "related" read --relates--.
Column 3, line 66, for "10-10%" read --10-20%--.
Column 6, line 22, for "he" read --the--.
Column 8, line 36, for "order The" read --order. The--.
Column 10, line 39, for "2.05" read --2.0--.
Column 12, line 12, for "filter claim" read --filter of claim--.

Signed and Sealed this

Twenty-second Day of January, 1991

Attest:

HARRY F. MANBECK, JR.

Attesting Officer     Commissioner of Patents and Trademarks